(No Model.)
W. PEABODY.
CANT DOG.
No. 265,135. Patented Sept. 26, 1882.
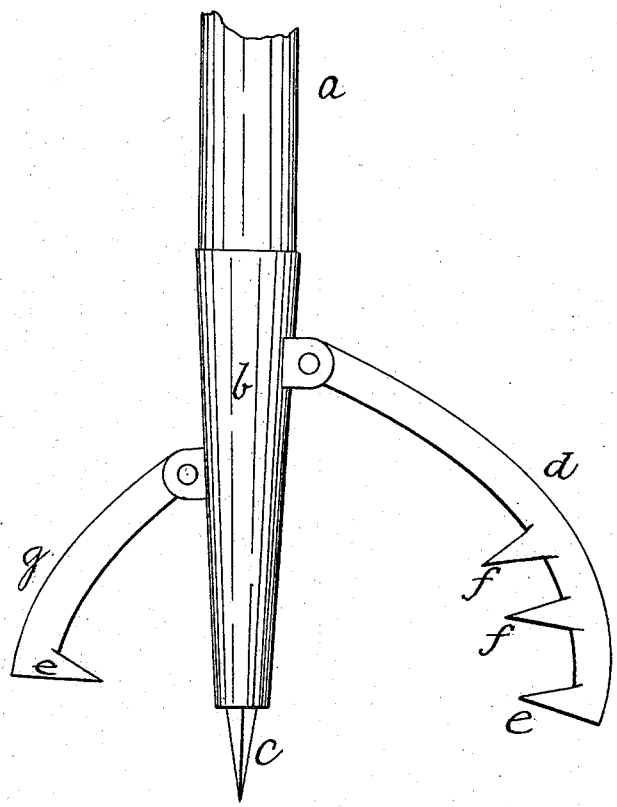

UNITED STATES PATENT OFFICE.

WASHBURN PEABODY, OF ORONO, MAINE.

CANT-DOG.

SPECIFICATION forming part of Letters Patent No. 265,135, dated September 26, 1882.

Application filed July 7, 1882. (No model.)

*To all whom it may concern:*

Be it known that I, WASHBURN PEABODY, of Orono, in the county of Penobscot and State of Maine, have invented certain new and useful Improvements in Cant-Dogs; and I do hereby declare that the following is a full, clear, and exact description of the invention, that will enable others skilled in the art to which it appertains to make and use the same, reference being had to the accompanying drawing, forming a part of this specification, in which is shown a side view of my invention.

My invention consists in an improved dog for cant-hooks, designed to enable the instrument to be used with equal advantage upon either large or small logs or like articles.

Reference to the drawing will explain my invention fully.

At $a$ is shown the stock of a cant-hook, $b$ the ferrule, and $c$ the pick, as common. To the ferrule (or ring) is attached, in any ordinary manner, a dog, $d$, containing my improvement, (or a part thereof.) This dog, in addition to the point $e$, as common, is provided with one or more extra points, $ff$, at different distances from its end, adapting it to logs or like articles of different sizes, the larger being caught by the point $e$ and the smaller by the inner points, $ff$.

At $g$ is shown another feature of my invention, which consists in providing the usual cant-hook stock with dogs, one on each side thereof, attached in the ordinary manner, but of different lengths, one being adapted to logs (or like articles) less in diameter or size than the other, so that by simply reversing the cant-hook it can be used upon articles of varying size.

What I claim as my invention is—

1. In combination with a cant-hook a dog, $d$, having two or more points, $eff$, at different distances from its end, substantially as herein set forth.

2. A cant-hook provided with the dogs $dg$, having one or more points, $eff$, both of said dogs being secured to the same stock, substantially as shown and described, and being of different lengths, as herein set forth.

In testimony that I claim the foregoing I have hereunto set my hand this 3d day of July, 1882.

WASHBURN $\underset{\text{mark}}{\overset{\text{his}}{+}}$ PEABODY.

Witnesses:
J. B. BASS,
WM. FRANKLIN SEAVEY.